United States Patent [19]
Chambers

[11] Patent Number: 4,568,204
[45] Date of Patent: Feb. 4, 1986

[54] JOURNAL BEARING

[75] Inventor: William S. Chambers, Philadelphia, Pa.

[73] Assignee: Kingsbury, Inc., Philadelphia, Pa.

[21] Appl. No.: 646,163

[22] Filed: Sep. 4, 1984

[51] Int. Cl.$^4$ .............................................. F16C 17/03
[52] U.S. Cl. ..................................... 384/152; 384/309
[58] Field of Search ............... 384/152, 309, 307, 117, 384/122

[56] References Cited

U.S. PATENT DOCUMENTS

| | | | |
|---|---|---|---|
| 2,348,928 | 5/1944 | Sampatacos | 384/309 |
| 3,023,055 | 2/1962 | Thompson | 384/117 |
| 4,490,054 | 12/1984 | Kimmelaar | 384/117 |

Primary Examiner—Lenard A. Footland
Attorney, Agent, or Firm—John F. A. Earley; John F. A. Earley, III

[57] ABSTRACT

A shoe journal bearing having a series of shoes with a leading edge distribution groove, and bleed grooves so as to prevent oil starvation of any area of the shoe, and an oil feed tube connected between the outer end of the oil distribution groove and an oil supply hole in a shoe retaining ring. The oil feed tube is provided with O-ring seals to seal the oil supply system against leakage and directs the oil against the working faces of the shoes where it is needed and prevents the oil from leaking into areas where it is not needed or useful.

5 Claims, 5 Drawing Figures

JOURNAL BEARING

RELATED APPLICATIONS

This application relates to my copending application Ser. No. 617,721, filed June 6, 1984, now U.S. Pat. No. 4,501,505, discloses a thrust bearing.

BACKGROUND OF THE INVENTION

1. Field of the Invention

This invention relates to journal bearings, and more particularly concerns shoe journal bearings.

2. Description of the Prior Art

Conventional shoe journal bearings are provided with an aligning ring on which is mounted a series of bearing shoes that are positioned so as to face the surface of a rotating shaft. Lubrication is provided to the bearing by feeding oil into passageways in the aligning ring that lead to a location between the shoes, and flooding the inside of the aligning ring and the shoes with oil. However, this system of lubrication consumes a large quantity of oil and creates a large power loss.

Accordingly, it has been desired to reduce the amount of oil flow in a journal bearing lubrication system, to increase the load carrying capabilities, and to lower the power loss, in the interest of energy conservation. Besides reducing the amount of oil used, and lowering the power loss, such a system would desirably use a smaller pump and other auxiliary equipment and be more efficient.

SUMMARY OF THE INVENTION

It is an object of this invention to provide a shoe journal bearing which increases the load carrying capacity, uses less oil, consumes less power, uses smaller auxiliary equipment, and is more efficient than the shoe journal bearings of the prior art.

This object is accomplished by providing a journal bearing having a series of shoes with a leading edge oil distribution groove and bleed grooves so as to prevent oil starvation of any area of the shoe, and an oil feed tube connected between the oil distribution groove and an oil supply hole in an aligning ring, which oil feed tube is provided with O-rings that seal the oil supply system against leakage. The leading edge oil distribution groove and bleed grooves direct the oil against the working faces of the shoes where it is needed, and feed tube O-rings prevent the oil from leaking into areas where it is not needed or useful.

BRIEF DESCRIPTION OF THE DRAWINGS

FIG. 5 is a view taken as indicated by the lines and arrows 5—5 which appear in FIG. 2.

DETAILED DESCRIPTION

Figure 2:
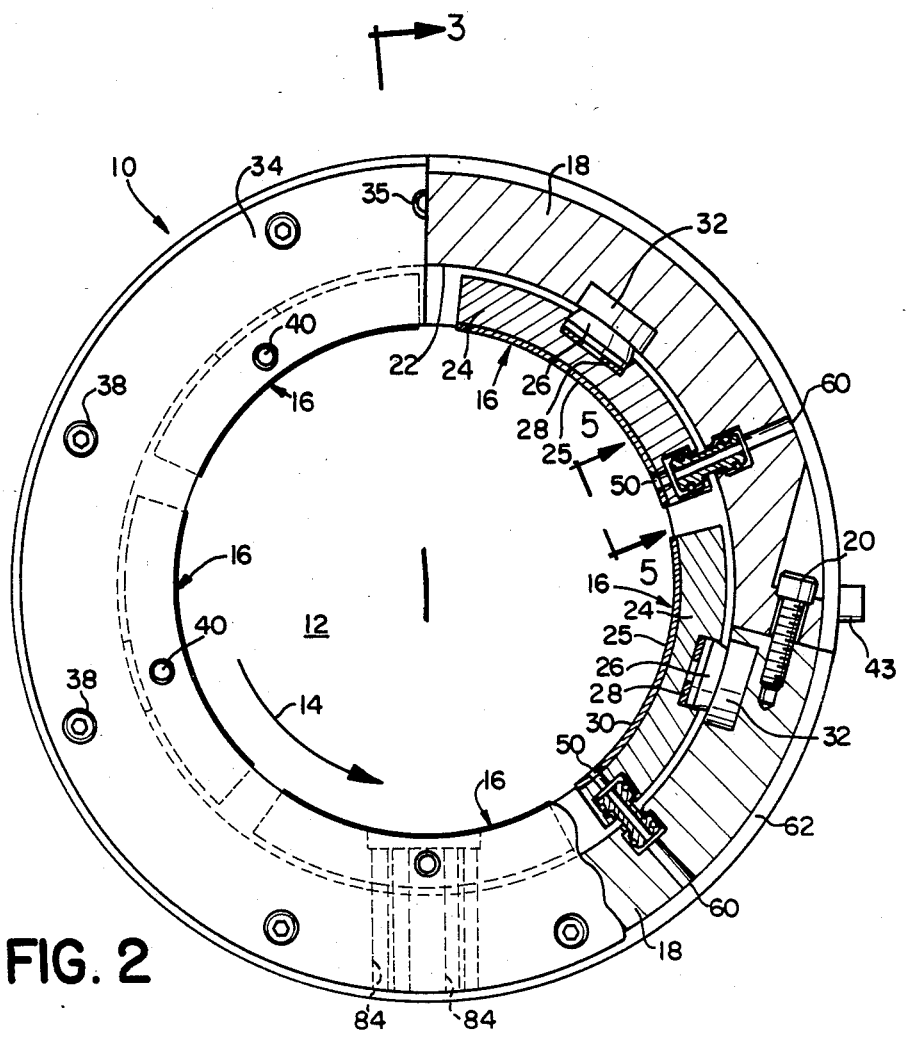
FIG. 2 is a side view of the journal bearing shown in FIG. 1.
Figure 4:
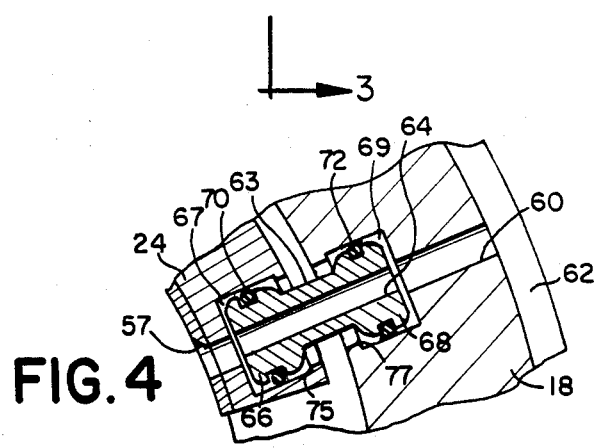
FIG. 4 is an enlarged view of an oil feed tube as shown in FIG. 2.

Referring to the drawings, there is shown a shoe journal bearing 10 for carrying the radial load of a shaft 12 mounted for rotation therein in the direction indicated by the arrow 14 in FIG. 2. Journal bearing 10 comprises five shoe assemblies 16 retained in position within an annular aligning ring 18.

Aligning ring 18 is made of two split half sections which are secured together by means of joint screws 20 at two sets of mating faces and are properly positioned by a dowel 21. The shoe assemblies 16 are retained within a circular inner rim 22 of aligning ring 18 in circumferentially equally spaced relation as shown in the drawings.

Each shoe assembly 16 comprises an arcuate shoe 24 provided with a bearing liner 25 on its inner surface, a shoe support 26 received in a recess hole centrally located in the outer surface of shoe 24, and a shoe support shim 28 located at the bottom of the recess hole containing the associated shoe support 26, the shims 28 being used for adjusting the position of the shoes 24 to allow for preloading of the bearing 10 as is conventional in the art. Bearing liner 25 provides a radially inwardly facing working face 30 of each shoe assembly 25 which face 30 is provided with the oil distributing means in accordance with the invention as will be described in detail hereafter with particular reference to FIG. 5.

The shoe support 26 of each shoe assembly 16 is arranged to contact an insert 32 retained in aligning ring 18 in alignment with an associated shoe support 26. Each shoe support 26 and insert 32 have cooperating spherical surfaces to allow the shoe assemblies 16 to pivot freely in any direction to conform to the surface of shaft 12 as it rotates.

Figure 3:
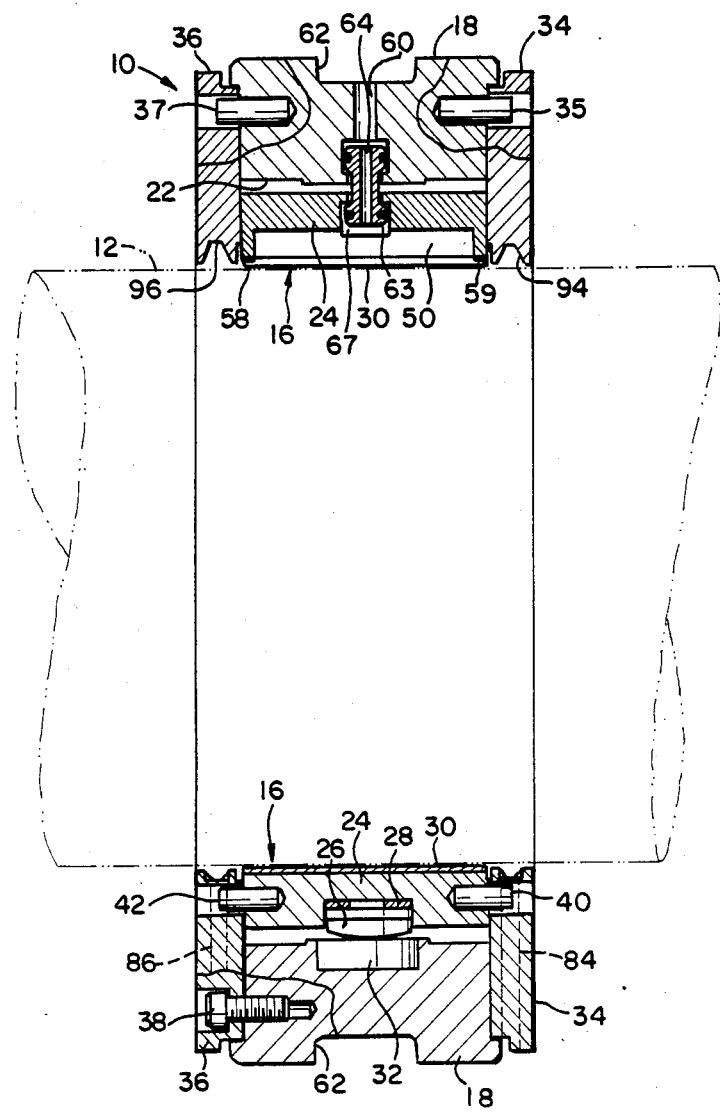
FIG. 3 is a view in section taken as indicated by the lines and arrows 3—3 which appear in FIG. 2.

As is shown in the drawings, shoe assemblies 16 are retained axially by a pair of shoe retaining plates 34 and 36 which have an annular configuration and are made of split halves. Each of the shoe retaining plates 34 and 36 is secured to a side of aligning ring 18 by means of a plurality of circumferentially spaced screws 38 in the manner shown in FIGS. 2 and 3. Aligning ring 18 is located relative to retaining plates 34 and 36 by means of a pair of locating pins 35 and 37, respectively, as shown in FIGS. 2 and 3. Each of the shoes 24 is retained in position relative to the side plates 34 and 36 by means of a pair of shoe stop pins 40 and 42, respectively, which engage the shoe 24 from each side thereof as shown in FIG. 3 and at a central location as is shown in FIG. 2. A pin 43 is provided in aligning ring 18 for locating bearing 10 in its housing.

In accordance with the invention, journal bearing 10 is provided with means for distributing oil along the leading edge of each of the working faces 30 of each shoe assembly 16. To this end, an oil distributing groove 50 is formed in the working face 30 of each shoe assembly 16 and has a configuration and location as is best shown in FIG. 5. As shown in this figure, oil distributing groove 50 is near the leading edge 51 of working face 30 and extends thereacross between its side edges 52 and 53. In effect, oil distributing groove 50 extends parallel to the axis of shaft 12 and across the path of movement of its surface. Oil distributing groove 50 has a leading edge 55 and a trailing edge 56. Trailing edge 56 is preferably chamfered so as to provide a chamfered surface 57 for the easy flow of oil from the oil distributing groove 50 in the trailing direction for covering the shoe working face 30 with oil during the rotation of shaft 12.

Referring to FIGS. 3 and 5, oil distributing groove 50 comprises a deep central portion and a pair of relatively shallow end portions 58 and 59 which form bleed areas for the flow of oil to the areas of working face 30 near side edges 52 and 53. This direction of oil flow assures distribution of oil across the entire leading edge of the working face 30 so that no wearing face area is starved of oil and so as to maintain the oil flow to prevent any build up of hot oil.

Each shoe assembly 16 has associated therewith an oil supply hole 60 extending radially through aligning ring 18 at a location aligned with the center of oil distributing groove 50. (see FIG. 3) The outer end of each oil supply hole 60 communicates with a circumferentially extending oil inlet groove 62 which cooperates with the housing for journal bearing 10 to define an oil inlet conduit extending circumferentially around the exterior of aligning ring 18 for use in delivering oil supplied thereto into the outer end of each oil supply hole 60.

Each shoe assembly 16 has an oil feed tube assembly 63 providing a radially extending passage 64 extending radially between the associated oil supply hole 60 and an opening formed by a socket 67 communicating with the center of oil distributing groove 50, as shown in the drawings. Each oil feed tube assembly 63 has ball-shaped portions 66 and 68 formed at the ends thereof and received in sockets 67 and 69 formed in shoe 24 and aligning ring 18, respectively. Ball-shaped portions 66 and 68 are provided with O-rings 70 and 72, respectively, constructed and arranged to contact the walls of sockets 67 and 69 in sealing engagement so that each oil feed tube assembly 63 is sealed against oil leakage.

A shoulder 75 is formed in the opening of socket 67 for retaining portion 66 of the tube assembly 63 in engagement with shoe 24, and similarly, a shoulder 77 is formed at the opening to socket 69 for retaining the other end 68 of oil feed tube assembly 63 in engagement with aligning ring 18.

Oil feed tube assembly 63 performs a dual function. Besides supplying oil from the oil supply hole 60 to the oil distribution groove 50 and preventing oil leakage from the tube assembly 63 because of the O-rings 70 and 72, the oil feed tube assembly 63 also assists in retaining the shoe 24 in position on the aligning ring 18. Also assisting in retaining the shoes 24 in ring 18 are the retainer pins 40 and 42 which extend from the shoe 24 into the retaining plates 34 and 36 as described above.

Figure 1:
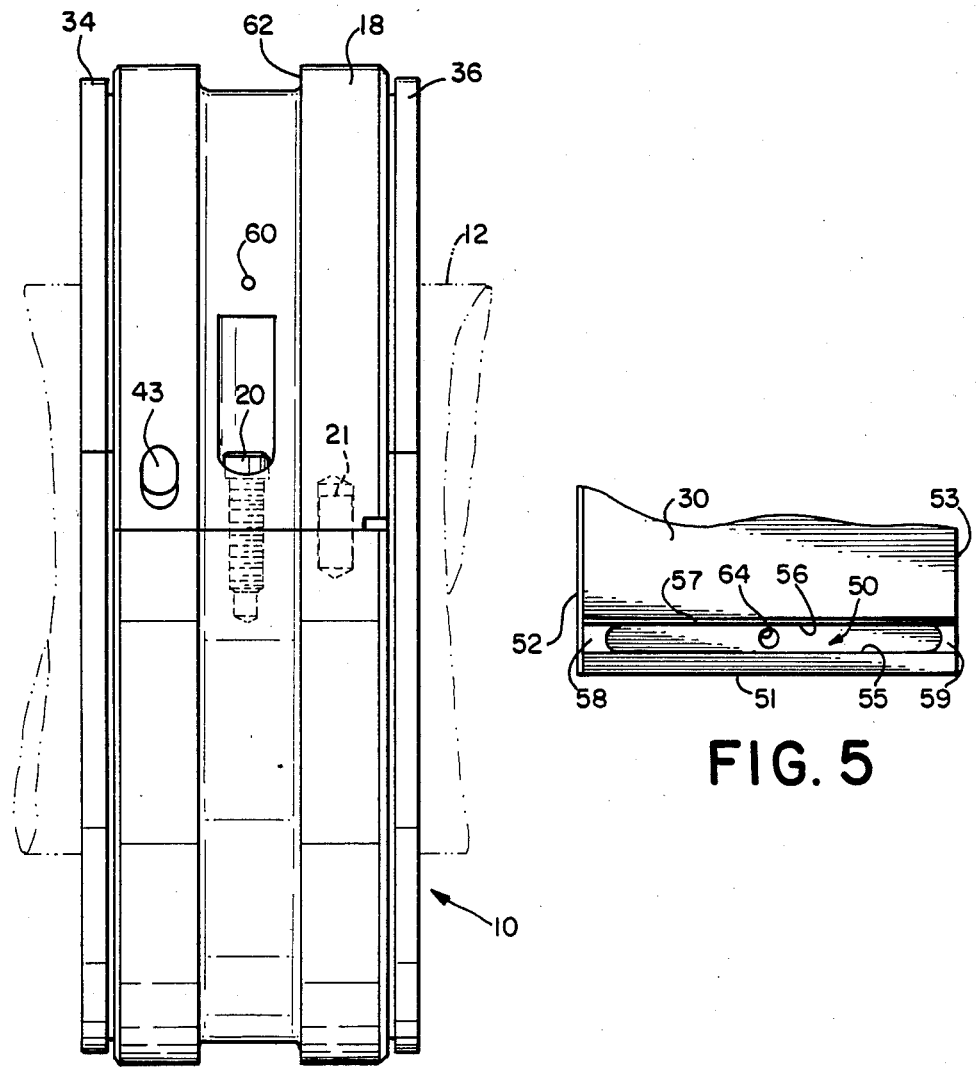
FIG. 1 is a front view in elevation of a shoe journal bearing constructed in accordance with this invention and positioned on a rotating shaft.

Each of the retaining plates 34 and 36 is provided with four vertically extending discharge holes 84 and 86, (FIG. 1), respectively. The holes 84 and 86 serve to drain any oil accummulating at the lower portion of the journal bearing 10 through the retaining plates 34 and 36 to the bottom portion of the thrust bearing 10 from which the oil flows to a suitable oil collector for recirculation to the oil system, as is conventional in the art.

The oil flow through the journal bearing 10 will now be described. The oil is supplied to the groove 62 on the exterior of aligning ring 18 and flows radially inwardly through the six oil supply holes 60 to the passage 64 of the associated oil feed tube assembly 63. The oil then flows from passage 64 into the center of oil distributing groove 50 and outwardly in each direction toward the bleed areas 58 and 59. Of course, as shaft 12 rotates past the leading edge of each working surface 30, it draws oil from the oil distributing groove 50 along working surface 30 toward its trailing edge. In addition, some of the oil flows axially past the inner ends of retaining plates 34 and 36 which are provided with labyrinth seals 94 and 96 respectively. The oil, of course, flows axially along the shaft 12 where it is eventually collected for recirculation through the oil system as is conventional in the art. Typically, the oil moving through the journal bearing 10 is gravity fed back into a reservoir and then cooled and pumped back out into the bearing 10 for reuse.

ADVANTAGES

Shoe journal bearing 10 of the present invention conserves energy by reducing the oil flow and consumes less power. It uses less lubricant, thus requiring a smaller pump and other auxiliary equipment. Journal bearing 10 is efficient, it applies the oil lubricant where it is needed and used, at the working face 30 of the shoe 24, and does not, as in conventional journal bearings, flood the cavity between the shoe retaining rings.

Journal bearing 10 is such an efficient bearing that it runs cooler since the oil is applied just where it is used, and since it runs cooler, it can carry higher loads.

I claim:

1. A journal bearing for supporting a rotating shaft, comprising:
   an aligning ring,
   a plurality of shoe assemblies retained within said aligning ring,
   each shoe assembly including an arcuate shoe having a working face for bearing contact with the rotating shaft, and
   means for delivering oil to the leading edge area of said working face of each shoe including
   an oil distribution groove formed in said working face near the leading edge of said shoe and extending across said shoe, and
   passage means for delivering oil to said oil distribution groove;
   said passage means includes an opening in said shoe communicating with the central portion of said oil distribution groove,
   an oil supply hole extending radially through said aligning ring and in alignment with said opening in said shoe, and
   an oil feed tube connected between the oil supply hole and said opening in said shoe for providing flow communication therebetween; and wherein
   said oil feed tube has ball-shaped portions at the ends thereof receiving O-ring seals,
   said O-ring seals cooperating with said aligning ring and said shoe to provide sealing contact therewith.

2. A journal bearing according to claim 1 wherein
   said ball-shaped portions of said oil feed tube are received in sockets in said aligning ring and said shoe and cooperate therewith to seal the tube against oil leaks, and
   including shoulders formed at the openings to said sockets for retaining the ends of said tube therein.

3. The journal bearings according to claim 1 wherein
   said oil distribution groove comprises a deep central portion and relatively shallow end portions extending to the side edges of said working face for forming bleed areas for the flow of oil from said deep central portion.

4. A journal bearing for supporting a rotating shaft, comprising:
   an aligning ring,
   a plurality of shoe assemblies retained within said aligning ring,
   each shoe assembly including an arcuate shoe having a working face for bearing contact with the rotating shaft, and
   means for delivering oil to the leading edge area of said working face of each shoe including an oil distribution groove formed in said working face near the leading edge of said shoe and extending across said shoe, and passage means for delivering oil to said oil distribution groove; and wherein said oil distribution groove comprises a deep central portion and relatively shallow end portions extending to the side edges of said working face for forming bleed areas for the flow of oil from said deep central portion.

5. A journal bearing for supporting a rotating shaft, comprising:

an aligning ring, a plurality of shoe assemblies retained within said aligning ring, each shoe assembly including an arcuate shoe having a working face for bearing contact with the rotating shaft, and means for delivering oil to the leading edge area of said working face of each shoe including an oil distribution groove formed in said working face near the leading edge of said shoe and extending across said shoe, and passage means for delivering oil to said oil distribution groove, said passage means including an opening in said shoe communicating with the central portion of said oil distribution groove, an oil supply hole extending radially through said aligning ring and in alignment with said opening in said shoe, and an oil feed tube connected between the oil supply hole and said opening in said shoe for providing flow communication therebetween.

said oil feed tube having ball-shaped portions at the ends thereof receiving O-ring seals, said O-ring seals cooperating with said aligning ring and said shoe to provide sealing contact therewith, said ball-shaped portions of said oil feed tube being received in sockets in said aligning ring and said shoe and cooperating therewith to seal the tube against oil leaks, and including shoulders formed at the openings of said sockets for retaining the ends of said tube therein, said oil distribution groove comprising a deep central portion and relatively shallow end portions extending to the side edges of said working face for forming bleed areas for the flow of oil from said deep central portion.

* * * * *